UNITED STATES PATENT OFFICE.

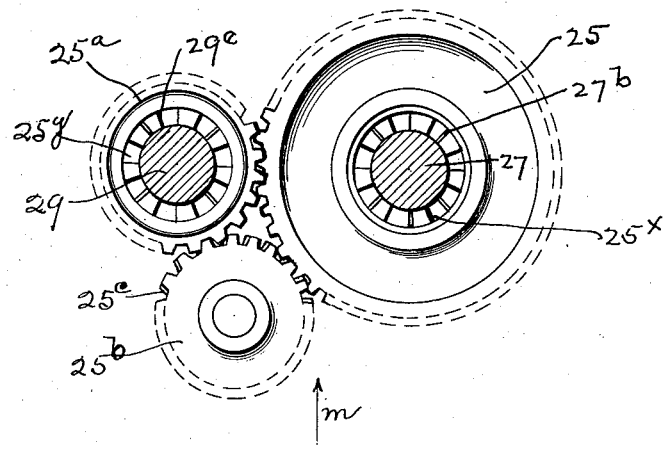
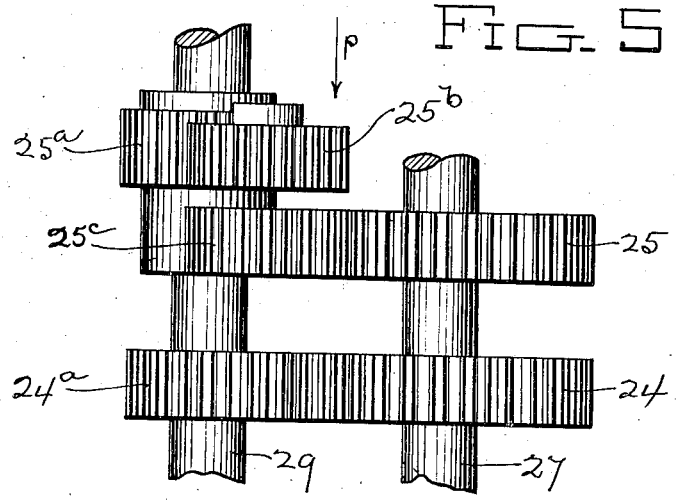

REINHOLD HERMAN, OF CRAFTON, PENNSYLVANIA.

POWER-TRANSMITTING MECHANISM.

983,445.            Specification of Letters Patent.    Patented Feb. 7, 1911.

Application filed May 27, 1908. Serial No. 435,231.  Renewed July 5, 1910.  Serial No. 570,394.

*To all whom it may concern:*

Be it known that I, REINHOLD HERMAN, a citizen of the United States of America, residing at Crafton, in the county of Allegheny and State of Pennsylvania, have invented certain new and useful Improvements in Power-Transmitting Mechanism, of which the following is a specification, reference being had therein to the accompanying drawing.

My invention relates to improvements in power transmission mechanism, and has particular relation to devices for changing the speed or direction of rotation of a driven shaft.

The particular objects of my invention are: First. To provide a structure in which the driving and driven shafts are operatively connected together in a manner to provide various changes in speed direction of movement of the driven shaft by means of a gear transmission mechanism movable axially with respect to the shafts and free of shaft support. Second. To provide a gear transmission mechanism in which the shafts are substantially free from gear strains. Third. To provide a structure in which the gears are movable as a unitary structure with respect to the shafts. Fourth. To provide a structure in which the gears are arranged in a plurality of pairs fixedly positioned relatively to each other and having common axes. Fifth. To provide a structure in which the pairs of gears are mounted in such manner that all of the pairs which are adapted to coöperate with the driven shaft are free from movement with the exception of the pair which is in operative engagement with said shaft. Sixth. To provide a structure in which the gear stress will be confined to each individual set of gears and taken up by their respective bearings, the latter having no connection with the shaft. Seventh. To provide a structure in which the gears are mounted in a carrier having an axial movement with respect to a casing and shafts, the mounting of the gears within the carrier being so arranged as to cause the strains to be confined to the bearings of the gears and the carrier. Eighth. To provide a structure which is compact, durable, easy to manipulate, quickly responsive, and of relative low cost of manufacture.

To this and other ends the nature of which will be readily understood as the invention is hereinafter described, my invention consists in the improved construction and combination of parts hereinafter fully described, illustrated in the accompanying drawings, and particularly pointed out in the appended claims.

Figure 1:
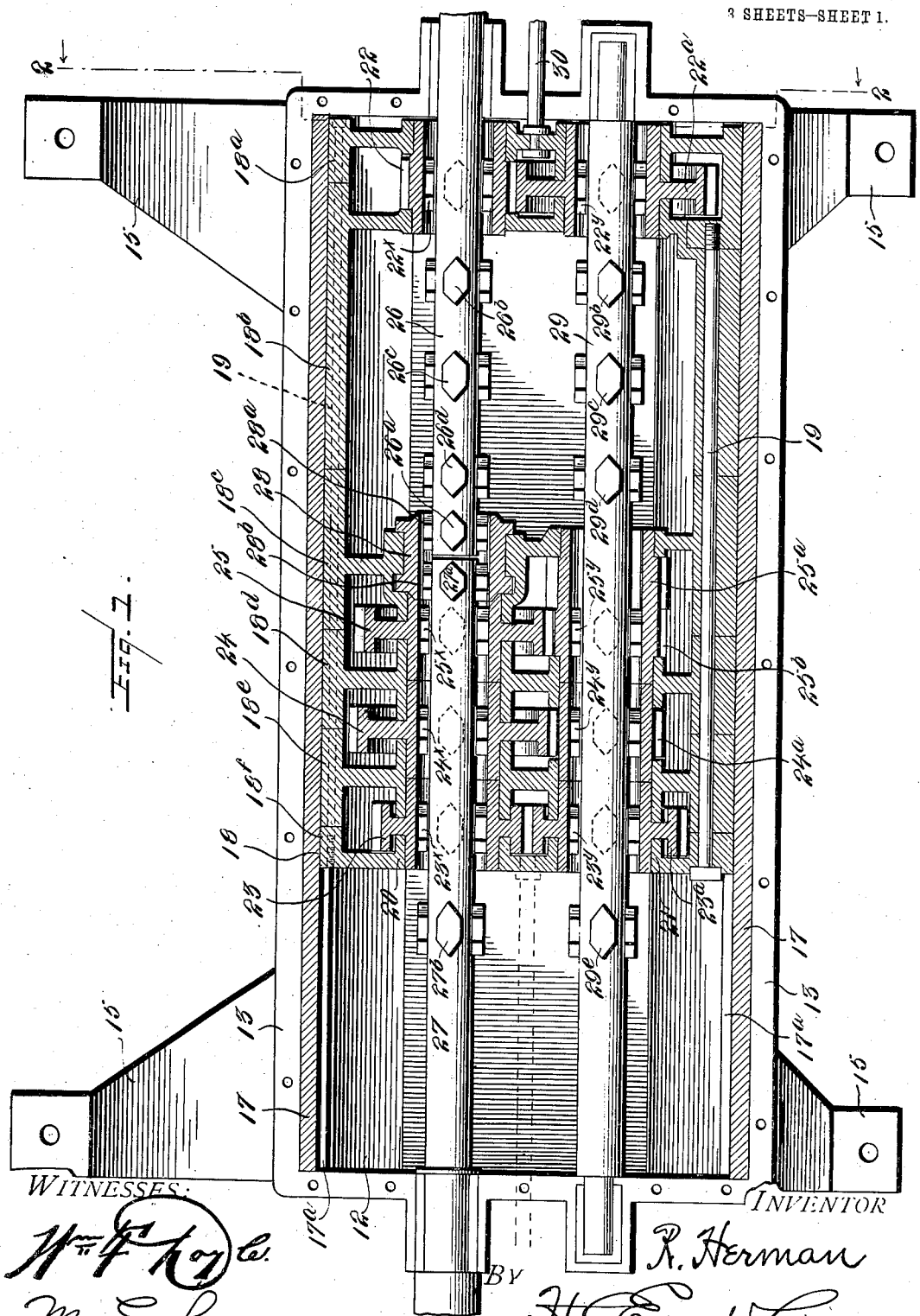
Figure 2:
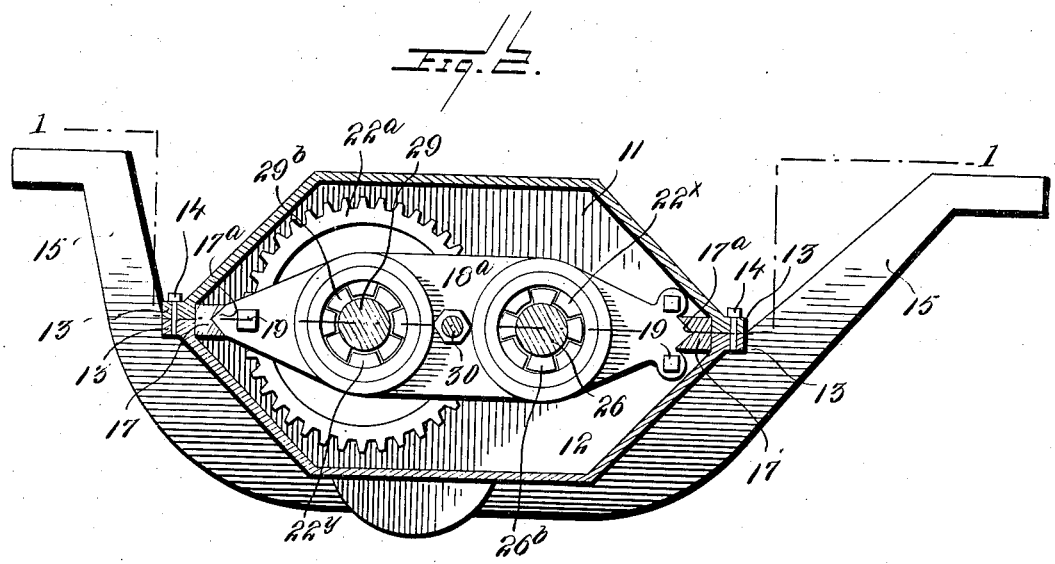
Figure 3:
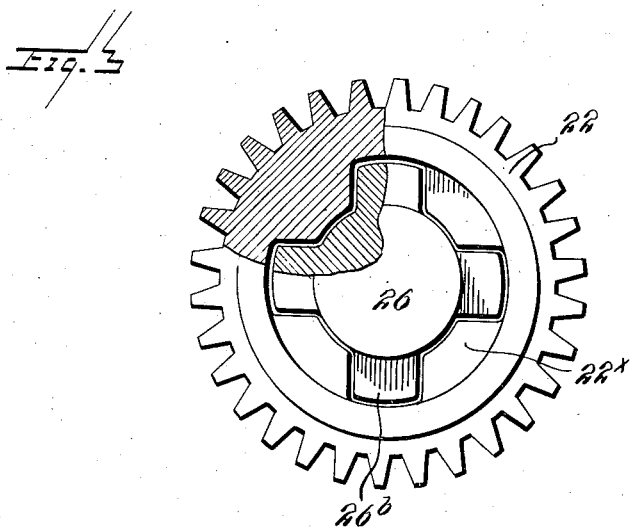

In the drawings, in which similar reference characters indicate similar parts in each of the views:—Figure 1 is a horizontal sectional view taken through the casing on the line 1—1 of Fig. 2. Fig. 2 is a vertical cross sectional view taken on line 2—2 of Fig. 1. Fig. 3 is an end elevation, partly in section, of one of the shafts and a gear in operative position relative thereto. Fig. 4 is an end view (looking in the direction of the arrow $p$ in Fig. 5) of the carrier, the carrier frame and the connecting member being omitted, the view illustrating the relative location of the reversing gears. Fig. 5 is a bottom plan view looking in the direction of the arrow $m$ in Fig. 4.

In the drawings, 10 designates a gear casing formed practically of two members 11 and 12, each of which is in the form of a shell having its sides inclined, the latter being formed with flanges 13, said flanges, when the casing is assembled, being removably secured together by a suitable means such as bolts or screws 14. Each of these members forms a shallow dish-like structure which, when secured together, forms a casing chamber having its greatest width on the plane of the flanges 13, the ends of the chamber being closed by walls within which are formed bearings for the shafts hereinafter indicated. The casing is secured to a suitable support by means of the arms 15 having their ends formed with lateral extensions perforated for the passage of bolts or other securing means.

17—17 designate two guides mounted within the casing members at their points of juncture (the point of greatest width of the chamber) and extending throughout the length of the casing, each of said guides being formed with a V-shaped groove 17$^a$ as shown in Fig. 2. The guides 17—17 are adapted to receive the gear carrier presently described, and the complemental arrangement of the guides and casing may be such that the members of the casing when secured together, will position the guides against a vertical movement without the necessity of employing securing means, but it will be understood that, if necessary, I may removably secure the guides to either or both members of the casing in any suitable manner in order that relative movement of the guides and casing will be prevented.

18 designates a gear carrier which is composed of a plurality of members secured together, said members having tongues formed complementally to the grooves 17$^a$. The members of the carrier are preferably formed as unitary structures. The members of the carrier are each formed with bearings 20 and 21 to receive the hubs of the gears carried thereby, the bearings 20 being for the gears coöperating with the drive or the driven shaft, as hereinafter explained, while the bearings 21 are provided for the gears coöperating with the counter or speed-changing shaft. As shown in Fig. 1, the bearings formed in the members are supported by webs, said bearings extending on opposite sides of the webs, while the tongue-carrying portions of the members are of greater length than the length of the bearings, the construction being such that when the members are secured together the bearings are spaced from each other a distance sufficient to permit of the passage of the webs of the gears, annular spaces being formed around the bearings within which spaces the toothed portions of the gears are located. For the purpose of distinguishing the members of the carrier, I have designated them in the drawings as 18$^a$, 18$^b$, 18$^c$, 18$^d$, 18$^e$, and 18$^f$. The members 18$^a$ and 18$^f$ form the outer members of the carrier, the remaining members being arranged successively between said outer members, all of the members being tied together by a suitable bolt or rod 19 extending therethrough as shown in Fig. 1. The members 18$^d$ and 18$^e$ are substantially similar in formation, member 18$^f$ differing therefrom mainly in that it comprises but one-half of the structure shown by members 18$^d$ or 18$^e$, the member 18$^f$ having a substantially flat surface on one side. The member 18$^c$, as shown in Fig. 1, differs from member 18$^d$ mainly in that said member carries the direct-drive connector hereinafter referred to, and is so formed as to provide an increased space between it and the member 18$^d$ on one side of the carrier, said space being also lengthened downwardly as indicated in Fig. 2. The member 18$^b$ is designed mainly as a spacing member to position the two main portions of the carrier relatively to each other so as to insure proper engagement of the parts when the carrier is shifted. As shown in Fig. 1, the members 18$^a$ and 18$^b$ at one side of the carrier are complementally formed in a manner different from the other side, this construction being for the purpose of allowing the members to be secured or tied together. By reason of the tying together of the separate members of the carrier, the latter is practically unitary in structure so that the movement imparted to either end of the carrier will cause the carrier to be moved longitudinally of the casing in an obvious manner. The carrier is completed by the following constructions:—22 and 22$^a$ designate coöperating gears located between the members 18$^a$ and 18$^b$, the hubs of said gears being mounted in the bearings 20 and 21 of said members. 23 and 23$^a$, 24 and 24$^a$, and gears 25 and 25$^a$ and 25$^b$ and pinion 25$^c$, designate sets of gears which coöperate with each other for the purpose of connecting the shafts hereinafter referred to, the gears 23, 24 and 25 being mounted in the bearings 20 of the members 18$^f$, 18$^e$, 18$^d$ and 18$^c$, while the gears 23$^a$, 24$^a$, and 25$^a$ are mounted in the bearings 21 of said members. The gears 25 and 25$^a$ are not geared together but are operatively connected together through gear 25$^b$ and pinion 25$^c$, the latter having their axes in alinement and being suitably mounted to rotate in unison, the gear 25$^b$ being geared with gear 25$^a$ while the pinion 25$^c$ is geared with gear 25. Coöperating or pairs or sets of gears are of such relative diameters as to provide different speeds of rotation of the gears 23 and 24, while the gear 25 is given a motion in a direction reverse to that of gears 23 and 24.

26 and 27 designate respectively the drive shaft and the driven shaft, said shafts being in alinement with each other, and having their ends extending within the casing chamber and into close proximity to each other. Each of said shafts is mounted in a bearing formed in the end of the casing through which it extends, and said shafts are positioned within the casing so as to pass centrally through the bearings 20 and the hubs of the gears carried thereby. The drive shaft 26, adjacent its end, is provided with radially extending lugs 26$^a$, (preferably four in number,) spaced equidistant one from another and arranged in circumferential alinement on the shaft. Said lugs are preferably provided with inclined faces as shown and are adapted to coöperate with similarly positioned lugs 28$^a$ formed on the inner periphery of the direct drive connector 28, the size of the respective lugs being such as to permit the lugs of one of the elements to enter the spaces between the lugs of the other element. The shaft 26 is also provided with similar lugs 26$^b$, 26$^c$ and 26$^d$, arranged in manner similar to that of the lugs 26$^a$, the several sets of lugs being spaced from each other a predetermined distance for a purpose presently described. The lugs 26$^b$, 26$^c$ and 26$^d$ are adapted to be engaged with lugs 22$^x$ formed on the inner periphery of gear 22. The driven shaft 27 is provided with radially extending lugs 27$^a$ positioned adjacent the end of the shaft, said lugs being adapted to coöperate with the inwardly projecting lugs 28$^b$ of the connector 28. Said shaft is also provided with a set of lugs 27$^b$ positioned on the shaft substantially as shown in Fig. 1, said lugs 27$^b$ being adapted to be engaged by the inwardly extending lugs 23$^x$, 24$^x$, and 25$^x$ respectively of gears 23, 24 and 25 when either of said gears may be brought to a position where its lugs will have a path of movement coincident with that of the lugs 27$^b$.

29 designates a countershaft extending from one end of the casing to the other, said shaft extending parallel with the drive and driven shaft and positioned to pass centrally through bearings 21 and the gears carried thereby. Said shaft 29 is provided with radially extending lugs 29$^b$, 29$^c$, 29$^d$ and 29$^e$ positioned in the manner shown in Fig. 1, the lugs 29$^b$, 29$^c$, and 29$^d$ being adapted to coöperate with the inwardly-extending lugs 22$^y$ of the gear 22$^a$, while the lugs 29$^e$ are adapted to coöperate with the inwardly-extending lugs 23$^y$, 24$^y$ and 25$^y$ formed respectively on the gears 23$^a$, 24$^a$ and 25$^a$, when any of said gears are brought into position to cause an engagement between the shaft and gear lugs. The lugs 26$^b$ and 26$^c$, 26$^d$ are in alinement with lugs 29$^b$, 29$^c$, and 29$^d$ respectively, while lugs 27$^b$ are in alinement with lugs 29$^e$. As indicated in the drawings the shaft and gear lugs have inclined faces, these being provided to insure against end to end locking contact of the lugs. As shown in the drawings, the gear lugs are of approximately the same length as that of the teeth of the gear on which the lugs are formed and are positioned in substantially radial alinement with the teeth. By this construction the lugs and gear teeth of the respective sets of gears are in alinement so that when operative engagement of the lugs is had the strains will not tend to produce a rocking effect on the gear or an unequal pressure on the bearings of the gears. Furthermore, as shown best in Fig. 3, the periphery of the lugs of the shafts and gears do not extend into contact with the periphery of the opposing element, but is spaced therefrom, so that actual contact of the respective lugs is only had on the sides of the lugs and consequently the only strain placed on the shafts when the gear engagement is had is a torsional one and that is reduced to a minimum owing to the presence of a plurality of lugs and the fact that the shaft is free from all frictional engagement, the gear strains, including those produced by the teeth strains, being borne by the bearings 20 or 21 as the case may be, and as these bearings are formed in the carrier which, in turn is supported in the guides 17, it will be understood that such gear stress is practically borne by the carrier and casing and not by the shafts. By referring to Fig. 1, it will also be seen that the hubs of adjacent gears are of such a length as to extend in proximity to each other, but it is to be understood that there is no frictional engagement between such hubs, the carrier members forming spacing devices which fixedly retain the gears against movement axially. It will also be seen that the lugs of the gears are of less length than the length of the hubs, being positioned intermediate the ends of the hubs. By this construction, the bearings for the gears are kept substantially free from sediment, while spaces are formed between successive sets of lugs into which the lugs of the shaft may pass while changing from one speed to another and which may form a neutral zone to stop movement of the driven shaft when at any speed without requiring the manipulation of the gears through different speeds. It will also be understood that only that set of gears which may be in operative engagement with the lugs of the shafts will be driven, the remaining gears being at rest.

As will be readily seen, the drive and driven shafts, when the parts are in the position shown in Fig. 1, are positively connected together by the connector 28, none of the gears being in operation. This is the direct-drive position of the mechanism and provides the high speed.

As heretofore stated, the carrier is movable in directions longitudinally of the guide 17, and these movements are provided for the purpose of engaging and disengaging the lugs of the gears and shafts in such manner as to change the speed or the direction of rotation of the driven shaft. Any suitable means may be employed for providing a longitudinal movement of the carrier, such for instance as a rod 30 mounted at one or both ends of the carrier and operatively connected to a suitable operating lever, not shown, said lever having the usual pawl and quadrant mechanism to permit of a step by step adjustment of the position of the carrier.

The manner in which the several movements of the driven shaft are obtained are as follows: Presuming the parts to be in position shown in Fig. 1, in which the high speed connections are presented, the various changes in speed are provided by moving the operating lever into successive notches so as to permit the position of the carrier relative to the shaft in such manner that the drive and driven shafts will have but a single point or circumferential line of points in operative relation to the transmitting mechanism at any one time. With the direct-drive in operation (the position shown in Fig. 1) a movement of the operating lever the distance of a single notch causes the connector 28 to be moved longitudinally of the casing in such manner as to disengage the lugs 26ª from lugs 28ª thereby breaking the positive or direct drive between the drive and driven shafts. If this movement of the carrier is less in length than the distance between the position of the lugs 22ˣ shown in Fig. 1 and the lugs 26ᵇ, no engagement of said lugs will be had and the shaft 26 will be allowed to run free, none of the gears being in operation, the driven shaft being free from rotation. If the operating lever be now operated to bring the lugs 22ˣ and 26ᵇ into operative engagement, the movement of the shaft 26 will be communicated to the shaft 29 through the gears 22 and 22ª. This movement of the carrier has brought the lugs 23ˣ and 23ʸ into operative engagement with the lugs 29ᵉ and 27ᵇ, and thereby completing the operative connection between the drive and driven shafts through the gears 22, 22ª and 23. Further movement of the carrier in the same direction causes the lugs 22ˣ to engage with the lugs 26ᶜ this engagement taking place simultaneously with the engagement of lugs 27ᵇ and 24ˣ, which engagement through the various connections, serves to rotate the driven shaft at what may be termed the low speed, the engagement of gears 23 and 23ª, with the lugs 27ᵇ and 29ᵉ heretofore pointed out, producing what is known as the intermediate speed. If the movement of the carrier in the same direction is continued the lugs 22ˣ engage with the lugs 26ᵈ, the drive connection between the drive shaft and driven shaft will be through the gears 22, 22ª, 25ª, 25ᵇ, pinion 25ᶜ and gear 25, this combination causing the shaft 27 to be driven in a reverse direction as will be obvious. A reverse movement of the operating lever from the position last indicated exactly reverses the operation just described, the carrier being moved to successively bring the low, intermediate and high speeds into operation heretofore indicated. As will be readily understood, if the lugs of the gears are positioned at a point intermediate the lugs of the shafts, no engagement of gears and shafts will result, so that at such intermediate points the neutral or inoperative positions of the carrier will be provided. Obviously, in such neutral positions, the drive connection between the shafts 26 and 27 is entirely broken.

As will be obvious, the movements of the carrier may be rapid or slow as described, the form of connection of the shafts and gears being such that free movement is had whenever the lever is manipulated.

Among the advantages resulting from this construction, are the following: The casing is of a minimum size and of a form readily lending itself to the prevention of dust. The arrangement of parts is such that the casing can be readily separated, the shafts removed without separating the relative gear arrangement, or the carrier may be removed as a unit, in addition, the carrier can be readily segregated into its gears and members, so that cleaning, assembling or repairing can be readily done. The only gears in motion when the driven shaft is being operated are those connecting the countershaft with the drive and driven shafts, the remainder of the gears remaining stationary. The stress of each set of gears is borne by a fixed and supported portion (the carrier) and is not communicated to the shafts, thereby not only prolonging the life of the gears but also preventing crystallization of the shafts, and by reason of the particular arrangement, the structure is practically noiseless, the fact that the gears are positively held against relative lateral movement aiding in this result.

In the present case I have disclosed a device in which but a single carrier is employed. I do not limit myself to this particular arrangement, since a similar result to that obtained herein may be obtained by the use of two carriers, a structure which I have shown and described in my application filed May 27, 1908, Serial No. 435,230.

While I have shown and described herein a preferred form of my invention, it is to be understood that variations in the form, arrangement and operation of the parts may be made, and I reserve the right to make such changes as may be desirable to carry out the objects of my invention in so far as such changes may fall within the spirit and scope of my invention as expressed in the accompanying claims.

Having thus described my invention what I claim as new is:

1. Power transmitting mechanism comprising a drive shaft, a driven shaft, a countershaft, and a gear transmission mechanism for operatively connecting the drive and driven shafts to provide a plurality of speeds to the driven shaft, said mechanism being movable longitudinally of the shafts as a unitary structure.

2. Power transmitting mechanism comprising a drive shaft, a driven shaft, said shafts being in alinement with each other, a countershaft extending in parallel relation to said shafts, and gear transmitting mechanism for operatively connecting said shafts to provide a plurality of speeds for the driven shaft, said mechanism being normally free from contact with the shafts and movable in directions longitudinally of the shaft to provide operative contact at predetermined points of the shafts.

3. In power transmitting mechanism, a drive shaft, a driven shaft in alinement therewith, means for forming a direct drive connection between the drive and driven shafts, a countershaft parallel with said shafts, and gear transmitting connections between the drive and driven shafts and coöperating with the countershaft to provide changes in speed of the driven shaft, said direct drive and speed changing connections being movable longitudinally of the shafts as a unitary structure.

4. In power transmitting mechanism a drive shaft, a driven shaft in alinement therewith, means for forming a direct drive connection between the drive and driven shafts, a countershaft parallel with said shafts, and gear transmitting connections between the drive and driven shafts and coöperating with the countershaft to provide changes in speed of the driven shaft, said direct drive and speed changing connections being movable longitudinally of the shafts as a unitary structure, said connections being normally free from contact with the shafts and brought into operative contact by such longitudinal movement.

5. In power transmitting mechanism a drive shaft, a driven shaft alined therewith, a direct drive connection between said shafts, a countershaft, and coöperating gears mounted to operatively connect the counter with the drive and driven shafts, said gears being movable longitudinally of the shafts, operative engagement of the gears and shafts being simultaneous during the longitudinal movement.

6. In power transmitting mechanism a drive shaft, a driven shaft alined therewith, a direct drive connection between said shafts, a countershaft, and coöperating gears mounted to operatively connect the counter with the drive and driven shafts, said gears being movable longitudinally of the shafts as a unitary structure, operative engagement of the gears and shafts being simultaneous during the longitudinal movement.

7. In power transmitting mechanism a drive shaft, a driven shaft alined therewith, a countershaft, each of said shafts having a plurality of radially-extending lugs in circumferential alinement, a direct drive connector for the drive and driven shafts, and coöperating gear connections for operatively connecting the drive and driven shafts through the shaft, said connector and the gears each having radially-extending lugs adapted to coöperate with the lugs of the shafts to provide operative engagement of the drive and driven shafts when the gears and connector are moved in directions longitudinally of the shafts.

8. In power transmitting mechanism, a casing, a drive and a driven shaft extending into said casing in alined relation, a countershaft carried by the casing, a carrier slidably mounted within the casing in directions longitudinally of the shafts, and shaft-connecting means carried by the carrier and, movable therewith for operatively connecting the drive and driven shafts either direct or through the countershaft.

9. In power transmitting mechanism, a casing, a drive and a driven shaft extending into said casing in alined relation, a countershaft carried by the casing, a carrier slidably mounted within the casing in directions longitudinally of the shafts, and shaft-connecting means carried by the carrier and movable therewith for operatively connecting the drive and driven shafts either direct or through the countershaft, said means being normally free of contact with the shafts, the movements of the carrier providing an operative contact of the means and shafts.

10. In power-transmitting and speed-changing mechanism, the combination with a drive and a driven shaft mounted in alinement, and a counter-shaft mounted in parallelism with said shafts, of gear mechanism for operatively connecting the drive shaft with the counter-shaft and the counter-shaft with the driven shaft, said gear mechanism being movable longitudinally of said shafts, said mechanism and shafts having complemental means for establishing operative connection at predetermined points in the longitudinal movement of the mechanism, the members of said complemental means being equal in number in the mechanism and the shafts.

11. In power-transmitting and speed-changing mechanism, the combination with a drive and a driven shaft mounted in alinement, and a counter-shaft mounted in parallelism with said shafts, of gear mechanism for operatively connecting the drive shaft with the counter-shaft and the counter-shaft with the driven shaft, said gear mechanism being movable longitudinally of said shafts, said mechanism and shafts having complemental means fixedly carried thereby for establishing operative connection at predetermined points in the longitudinal movement of the mechanism, the members of said complemental means being equal in number in the mechanism and the shafts.

12. In power-transmitting and speed-changing mechanism, the combination with a drive and a driven shaft mounted in alinement, and a counter-shaft mounted in parallelism with said shafts, of gear mechanism having an operative relationship with said shafts to provide an operative connection between the drive and counter-shafts and between the counter and driven shafts, and complemental members carried by the gears and the shafts and positioned thereon against relative axial movement therewith for establishing operative connection therebetween at predetermined points on the shafts, said members being equal in number in the mechanism and on the shafts.

13. In power-transmitting and speed-changing mechanism, the combination with a drive and a driven shaft mounted in alinement, and a counter-shaft mounted in parallelism with said shafts, of gear mechanism having an operative relationship with said shafts to provide an operative connection between the drive and counter-shafts and between the counter and driven shafts, and complemental members carried by the gears and the shafts and positioned thereon against relative axial movement therewith for establishing operative connection therebetween at predetermined points on the shafts, said members being equal in number in the mechanism and on the shafts, the number of members on the driven shaft being less than those on the drive shaft.

14. In power-transmitting and speed-changing mechanism, the combination with a drive and a driven shaft mounted in alinement, and a counter-shaft mounted in parallelism with said shafts, of gear mechanism having an operative relationship with said shafts to provide an operative connection between the drive and counter shafts and between the counter and driven shafts, said mechanism including a plurality of gears in coöperating relationship and free from relative axial movement, and a plurality of complemental engaging devices carried by the gears and shafts, to operatively connect the same, said engaging devices being positioned on the parts by which they are carried in a manner to prevent relative axial movement therewith, the devices on the shafts being spaced apart.

15. In power-transmitting and speed-changing mechanism, the combination with a drive and a driven shaft mounted in alinement, and a counter-shaft mounted in parallelism with said shafts, of gear mechanism having an operative relationship with said shafts, to provide an operative connection between the drive and counter shafts and between the counter and driven shafts, said mechanism being movable longitudinally of the shafts, and operatively connectible with the shafts at a plurality of predetermined points in the longitudinal movement of the mechanism, said points being greater in number on the drive than on the driven shaft.

16. In power-transmitting and speed-changing mechanism, the combination with a drive and a driven shaft mounted in alinement, and a counter-shaft mounted in parallelism with said shafts, of gear mechanism having an operative relationship with said shafts to provide an operative connection between the drive and counter shafts and between the counter and driven shafts, said mechanism being movable longitudinally of the shafts and operatively connectible with the shafts at a plurality of predetermined points in the longitudinal movement of the mechanism, said points being greater in number on the drive than on the driven shaft, the connection of the mechanism and shafts being limited to a single point on each of the drive and driven shafts within the limit of longitudinal movement of the mechanism.

17. In power-transmitting and speed-changing mechanism, the combination with a drive and a driven shaft mounted in alinement, and a counter-shaft, of a plurality of gears in operative relationship and free from relative axial movement, said gears being mounted relative to the shafts in a manner to permit operative connection between the drive and counter shafts and between the counter and driven shafts, and complemental engaging devices carried by the gears and the shafts for operatively connecting the gears and shafts to drive the driven shaft through the counter shaft, said engaging devices on the shafts being fixedly positioned relatively thereto in corresponding positions on the drive and counter shafts and counter and driven shafts, the corresponding devices on the drive and counter shafts being greater in number than the complemental devices operable in connection with the counter and driven shafts.

18. In power-transmitting and speed-changing mechanism, the combination with a drive and driven shaft mounted in alinement, and a counter shaft, of means coöperating with the counter-shaft for operatively connecting the drive and driven shafts, the points of possible operative connection being spaced from each other longitudinally of the shafts at permanent predetermined distances, the active connection of the shafts being limited to a single point on the drive and driven shafts.

19. In power transmitting and speed-changing mechanism, the combination with a drive and driven shaft mounted in alinement, and a counter shaft, of means coöperating with the counter-shaft for operatively connecting the drive and driven shafts, the points of possible operative connection being spaced from each other longitudinally of the shafts at predetermined distances and being greater in number on the drive shaft than on the driven shaft, the active connection of the shafts being limited to a single point on the drive and driven shafts.

20. In power-transmitting and speed-changing mechanism, the combination with a drive and driven shaft mounted in alinement, and a counter shaft, of means coöperating with the counter-shaft for operatively connecting the drive and driven shafts, the points of possible operative connection being spaced from each other longitudinally of the shafts at permanent predetermined distances, the active connection of the shafts being limited to a single point on the drive and driven shafts, the number of points on the drive shaft at which connection may be made being equal to the number of speed changes of the mechanism provided through the counter-shaft.

21. In power-transmitting and speed-changing mechanism, the combination with a drive and a driven shaft, of means for operatively connecting said shafts during movements of the means longitudinally of the shafts and at pre-determined points within the limits of such longitudinal movements, the number of points on the drive shaft at which connection may be made being equal to the number of speed changes of the mechanism, said means being free from connection with either shaft excepting when in position at such predetermined points.

In testimony whereof I affix my signature in the presence of two witnesses.

REINHOLD HERMAN.

Witnesses:
GILMORE HERMAN,
ERNEST PAYNE.